US011733694B2

(12) United States Patent
Matsunaga et al.

(10) Patent No.: US 11,733,694 B2
(45) Date of Patent: Aug. 22, 2023

(54) CONTROL APPARATUS, CONTROL METHOD, AND STORAGE MEDIUM

(71) Applicant: HONDA MOTOR CO., LTD., Tokyo (JP)

(72) Inventors: Hideki Matsunaga, Wako (JP); Masamitsu Tsuchiya, Wako (JP); Toshiaki Takano, Tokyo (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 569 days.

(21) Appl. No.: 16/828,455

(22) Filed: Mar. 24, 2020

(65) Prior Publication Data
US 2020/0310416 A1  Oct. 1, 2020

(30) Foreign Application Priority Data

Mar. 29, 2019 (JP) .................................. 2019-067125

(51) Int. Cl.
*G05D 1/00*        (2006.01)
*G05D 1/02*        (2020.01)

(52) U.S. Cl.
CPC ......... *G05D 1/0044* (2013.01); *G05D 1/0022* (2013.01); *G05D 1/0278* (2013.01)

(58) Field of Classification Search
CPC .. G05D 1/0038; G05D 1/0044; G05D 1/0022; G05D 1/0278; G05D 2201/0213; G09G 2340/12; G06F 3/147
See application file for complete search history.

(56) References Cited

U.S. PATENT DOCUMENTS

| 10,678,237 | B2 | 6/2020 | Yoneda et al. | |
|---|---|---|---|---|
| 2017/0108877 | A1* | 4/2017 | Zang | .................... G05D 1/0088 |
| 2018/0032071 | A1* | 2/2018 | Wieneke | .............. G05D 1/0038 |
| 2018/0181118 | A1 | 6/2018 | Yoneda et al. | |
| 2018/0308275 | A1* | 10/2018 | Fortmann | ............ G05D 1/0094 |
| 2018/0314247 | A1* | 11/2018 | Sun | ..................... G06F 16/2455 |

FOREIGN PATENT DOCUMENTS

| JP | 2013-115803 A | 6/2013 |
|---|---|---|
| JP | 2018-106676 A | 7/2018 |
| JP | 2018-142921 A | 9/2018 |

OTHER PUBLICATIONS

Japanese Office Action for Japanese Patent Application No. 2019-067125 dated Oct. 17, 2022 (partially translated).

* cited by examiner

*Primary Examiner* — Abby Y Lin
*Assistant Examiner* — Renee LaRose
(74) *Attorney, Agent, or Firm* — Thomas | Horstemeyer, LLP

(57) ABSTRACT

A control apparatus for remotely operating an operation target is provided. The apparatus includes an acquisition unit configured to acquire information regarding an object that exists in the surroundings of the operation target, and is not to be operated by the control apparatus, from an information providing unit outside the control apparatus, a determination unit configured to determine a virtual object for representing the object, based on the information regarding the object, and a display control unit configured to display the virtual object at a display position corresponding to a geographical location of the object.

20 Claims, 12 Drawing Sheets

CONTROL APPARATUS, CONTROL METHOD, AND STORAGE MEDIUM

CROSS-REFERENCE TO RELATED APPLICATION(S)

This application claims priority to and the benefit of Japanese Patent Application No. 2019-067125 filed on Mar. 29, 2019, the entire disclosure of which is incorporated herein by reference.

BACKGROUND OF THE INVENTION

Field of the Invention

The present invention relates to a control apparatus, a control method, and a storage medium.

Description of the Related Art

Remote driving techniques, also known as tele-operated driving techniques, in which a vehicle is operated by an operator located in a distant place are known. There is a demand for, in remote driving, sufficiently suppressing a delay in communication between an operator apparatus for an operator that executes remote driving and a user terminal mounted in a vehicle, along with other demands. In Japanese Patent Laid-Open No. 2013-115803, a communication amount is reduced by transmitting difference information of three-dimensional map data of the environment around a vehicle.

SUMMARY OF THE INVENTION

Even if difference information is used, there is still room for improvement in reducing the communication amount. According to some aspects of the present invention, a technique for reducing a communication amount in a remote operation is provided.

In view of the above-described issue, a control apparatus for remotely operating an operation target includes an acquisition unit configured to acquire information regarding an object that exists in the surroundings of the operation target, and is not to be operated by the control apparatus, from an information providing unit outside the control apparatus, a determination unit configured to determine a virtual object for representing the object, based on the information regarding the object, and a display control unit configured to display the virtual object at a display position corresponding to a geographical location of the object is provided.

DESCRIPTION OF THE EMBODIMENTS

Figure 1:
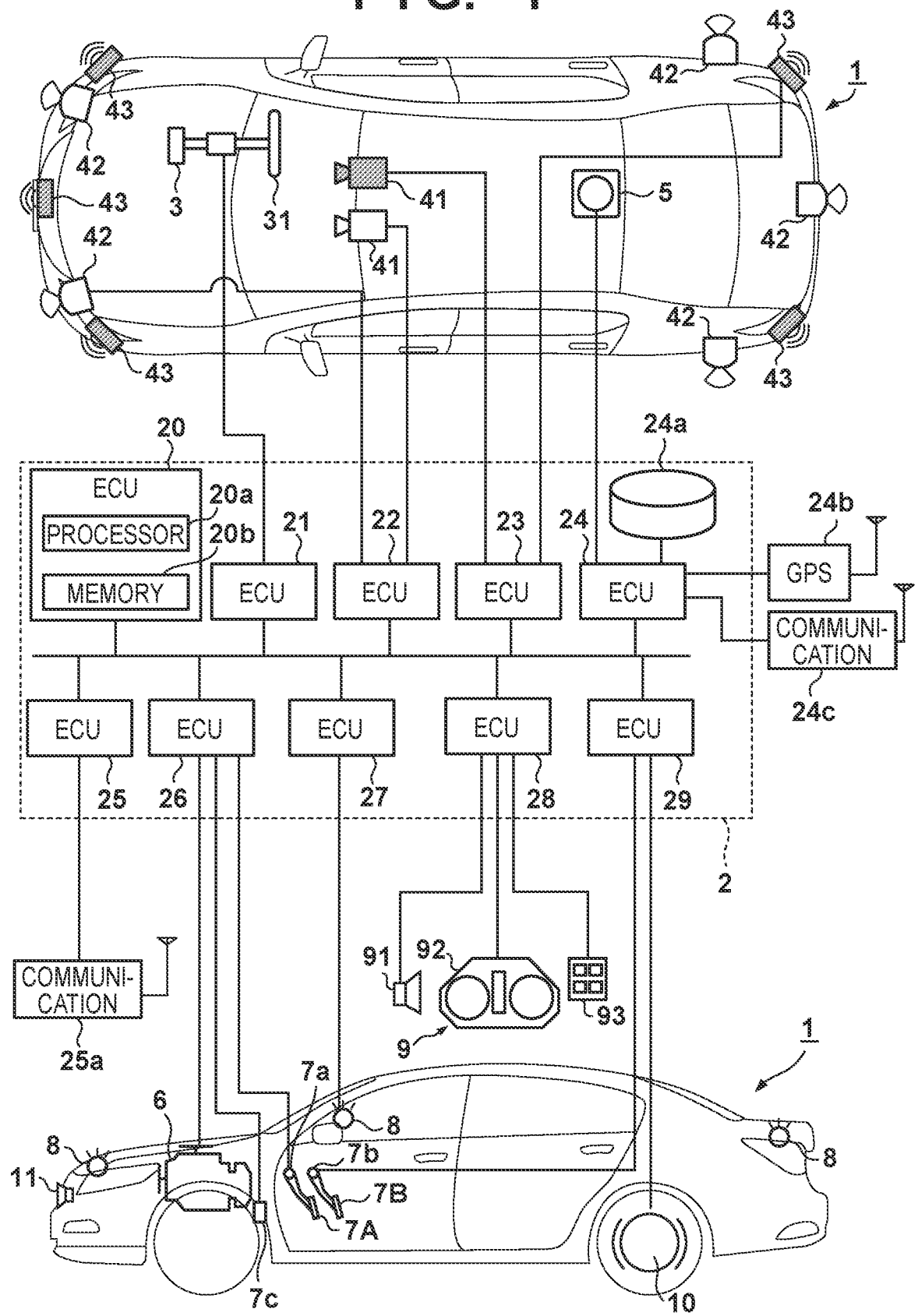
FIG. 1 is a block diagram illustrating a configuration example of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A vehicle 1 includes a vehicle control apparatus 2 (hereinafter, simply referred to as "control apparatus 2") that controls the vehicle 1. The control apparatus 2 includes a plurality of ECUs 20 to 29 that are communicably connected by an in-vehicle network. Each of the ECUs includes a processor represented by a CPU, a memory such as a semiconductor memory, an interface to an external device, and the like. The memory stores programs that are executed by the processor, data that is used by the processor to perform processing, and the like. Each of the ECUs may include a plurality of processors, memories, interfaces, and the like. For example, the ECU 20 includes a processor 20a and a memory 20b. Processing that is performed by the ECU 20 is executed as a result of the processor 20a executing an instruction included in a program stored in the memory 20b. Alternatively, the ECU 20 may include a dedicated integrated circuit such as an ASIC for executing processing that is performed by the ECU 20. The same applies to the other ECUs.

Functions allocated to the (respective) ECUs 20 to 29, and the like will be described below. Note that the number of ECUs and functions allocated to the ECUs can be designed as appropriate, and can be segmentalized further than those in this embodiment, or can be integrated.

The ECU 20 executes running control related to an automated driving function and a remote driving function of the vehicle 1. In this running control, the ECU 20 automatically controls steering and/or acceleration/deceleration of the vehicle 1. The automated driving function is a function of the ECU 20 planning a running route of the vehicle 1, and controlling steering and/or acceleration/deceleration of the vehicle 1 based on this running route. The remote driving function is a function of the ECU 20 controlling steering and/or acceleration/deceleration of the vehicle 1 in accordance with an instruction from an operator outside the vehicle 1. The operator outside the vehicle 1 may be a human or an AI (artificial intelligence). The ECU 20 can execute the automated driving function and the remote operation function in combination. For example, a configuration may also be adopted in which the ECU 20 plans a running route and performs running control when there is no instruction from an operator, and when there is an instruction from an operator, performs running control in accordance with the instruction.

The ECU 21 controls an electronic power steering apparatus 3. The electronic power steering apparatus 3 includes a mechanism for steering front wheels according to a driver's driving operation (steering operation) on a steering wheel 31. The electronic power steering apparatus 3 also includes a motor that exerts drive force for assisting a steering operation and automatically steering the front wheels, a sensor that detects a steering angle, and the like. When the driving state of the vehicle 1 is an automated driving state, the ECU 21 automatically controls the electronic power steering apparatus 3 according to an instruction from the ECU 20, and controls the direction of forward movement of the vehicle 1.

The ECUs 22 and 23 control detection units 41 to 43 that detect the situation of the outside of the vehicle, and perform information processing on detection results. Each detection unit 41 is a camera for shooting an image ahead of the vehicle 1 (which may hereinafter be referred to as "camera 41"), and, in this embodiment, is installed at a roof front part and on an interior side of the front window. By analyzing an image shot by a camera 41, it is possible to extract the contour of an object and a demarcation line (white line, for example) of a traffic lane on a road.

Each detection unit 42 is a LIDAR (Light Detection and Ranging, may hereinafter be referred to as "LIDAR 42"), detects an object in the surroundings of the vehicle 1, and measures the distance from the object. In this embodiment, five LIDARs 42 are provided, two of the five LIDARs 42 being provided at the respective front corners of the vehicle 1, one at the rear center, and two on the respective sides at the rear. Each detection unit 43 is a millimeter-wave radar (which may hereinafter be referred to as "radar 43"), detects an object in the surroundings of the vehicle 1, and measures the distance from a marker. In this embodiment, five radars 43 are provided, one of the radars 43 being provided at the front center of the vehicle 1, two at the respective front corners, and two at the rear corners.

The ECU 22 controls one camera 41 and the LIDARs 42, and performs information processing on their detection results. The ECU 23 controls the other camera 41 and the radars 43, and performs information processing on their detection results. By providing two sets of apparatuses that detect the surrounding situation of the vehicle, the reliability of detection results can be improved, and by providing detection units of different types such as cameras, LIDARs, and radars, the surrounding environment of the vehicle can be multilaterally analyzed.

The ECU 24 controls a gyro sensor 5, a GPS sensor 24b, and a communication apparatus 24c, and performs information processing on their detection results or communication results. The gyro sensor 5 detects rotary movement of the vehicle 1. A course of the vehicle 1 can be determined based on a detection result of the gyro sensor 5, a wheel speed, and the like. The GPS sensor 24b detects the current position of the vehicle 1. The communication apparatus 24c wirelessly communicates with a server that provides map information and traffic information, and acquires such information. The ECU 24 can access a database 24a of map information built in the memory, and the ECU 24 searches for a route from the current location to a destination, and the like. The ECU 24, the map database 24a, and the GPS sensor 24b constitute a so-called navigation apparatus.

The ECU 25 includes a communication apparatus 25a for inter-vehicle communication. The communication apparatus 25a wirelessly communicates with another vehicle in the surroundings thereof, and exchanges information with the vehicle. The communication apparatus 25a is also used for communication with an operator outside the vehicle 1.

The ECU 26 controls a power plant 6. The power plant 6 is a mechanism for outputting drive force for rotating the drive wheels of the vehicle 1, and includes an engine and a transmission, for example. For example, the ECU 26 controls output of the engine in accordance with a driver's driving operation (an accelerator operation or an accelerating operation) detected by an operation detection sensor 7a provided on an accelerator pedal 7A, and switches the gear stage of the transmission based on information regarding the vehicle speed detected by a vehicle speed sensor 7c. When the driving state of the vehicle 1 is an automated driving state, the ECU 26 automatically controls the power plant 6 in accordance with an instruction from the ECU 20, and controls the acceleration/deceleration of the vehicle 1.

The ECU 27 controls illumination apparatuses 8 (lights such as headlights and taillights) that include direction indicators (blinkers). In the example in FIG. 1, the illumination apparatuses 8 are provided on door mirrors, at the front, and at the rear of the vehicle 1. The ECU 27 further controls an acoustic apparatus 11 that includes a horn and is directed to the outside of the vehicle. The illumination apparatuses 8, the acoustic apparatus 11, or a combination thereof has a function of providing information to the outside the vehicle 1.

The ECU 28 controls an input/output apparatus 9. The input/output apparatus 9 outputs information to the driver, and receives information from the driver. An audio output apparatus 91 notifies the driver of information using sound. A display apparatus 92 notifies the driver of information through image display. The display apparatus 92 is installed in front of the driver's seat, for example, and constitutes an instrument panel, or the like. Note that, here, sound and display are illustrated, but information may be notified using vibration and light. In addition, information may also be notified using a combination of some of sound, display, vibration, and light. Furthermore, the combination or a notification aspect may be different according to the level of information to be notified (for example, an emergency level). Input apparatuses 93 are a group of switches arranged at positions so as to enable the driver to perform an operation on the switches to give an instruction to the vehicle 1, but may include an audio input apparatus. The ECU 28 can give guidance related to running control of the ECU 20. The guidance will be described later in detail. The input apparatuses 93 may also include a switch used for controlling an operation of running control by the ECU 20. The input apparatuses 93 may also include a camera for detecting the direction of a line of sight of the driver.

The ECU 29 controls a brake apparatus 10 and a parking brake (not illustrated). The brake apparatus 10 is, for example, a disk brake apparatus, is provided for each of the wheels of the vehicle 1, and decelerates or stops the vehicle 1 by imposing resistance to rotation of the wheels. The ECU 29 controls activation of the brake apparatus 10, for example, in accordance with a driver's driving operation (brake operation) detected by an operation detection sensor 7b provided on a brake pedal 7B. When the driving state of the vehicle 1 is an automated driving state, the ECU 29 automatically controls the brake apparatus 10 in accordance with an instruction from the ECU 20, and controls deceleration and stop of the vehicle 1. The brake apparatus 10 and the parking brake can also be activated to maintain a stopped state of the vehicle 1. In addition, if the transmission of the power plant 6 includes a parking lock mechanism, this can also be activated in order to maintain a stopped state of the vehicle 1.

A configuration of a remote driving apparatus 200 according to some embodiments of the present invention will be described with reference to the block diagram in FIG. 2. The remote driving apparatus 200 is an apparatus that provides a remote driving service to a vehicle that has a remote driving function. The remote driving apparatus 200 is positioned at a remote location from a vehicle to which the service is provided.

The remote driving apparatus 200 may be able to provide the remote driving service in a plurality of operation modes. The plurality of operation modes of the remote driving service may include a leading mode and an assisting mode. The leading mode refers to an operation mode in which the operator of the remote driving apparatus 200 specifies control amounts (for example, a steering angle, an accelerator pedal position, a brake pedal position, a position of the directional signal lever, and on/off of the lights) of the vehicle. The assisting mode refers to an operation mode in which the vehicle (specifically, the ECU 20) determines control amounts of the vehicle in accordance with a path plan specified by the operator of the remote driving apparatus 200. In the assisting mode, the operator of the remote driving apparatus 200 may generate and designate a path plan for themselves, or may adopt and designate a path plan suggested by the vehicle.

Figure 2:
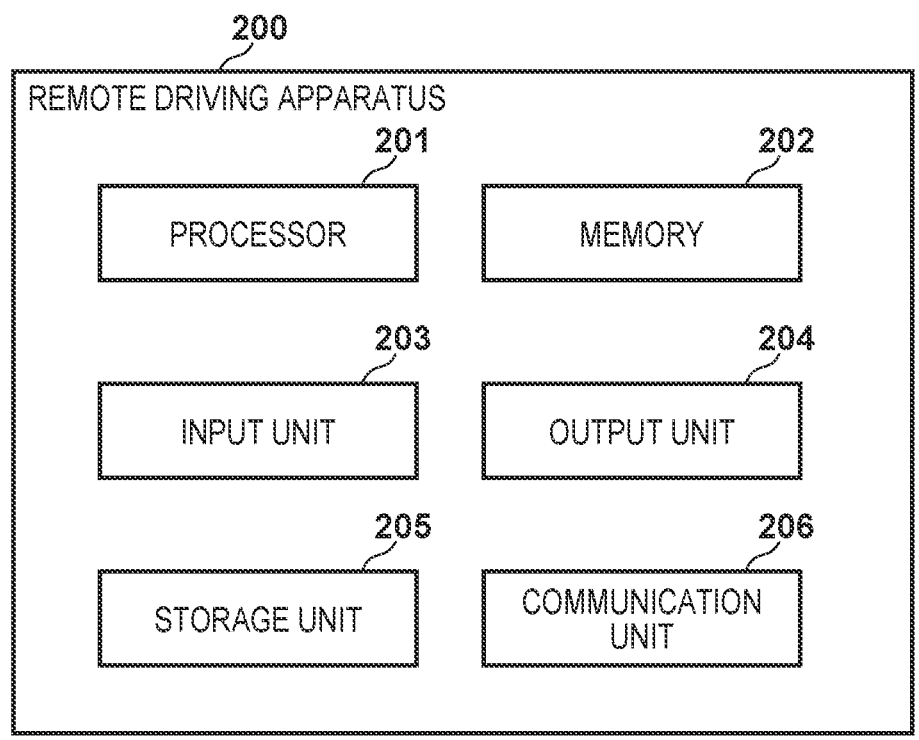
FIG. 2 is a block diagram illustrating a configuration example of a remote driving apparatus according to an embodiment of the present invention.

The remote driving apparatus 200 includes constituent elements shown in FIG. 2. A processor 201 controls overall operations of the remote driving apparatus 200. The processor 201 functions as a CPU, for example. A memory 202 stores programs that are used for operations of the remote driving apparatus 200, temporary data, and the like. The memory 202 is realized by a ROM and a RAM, for example. An input unit 203 is used by the user of the remote driving apparatus 200 to perform input to the remote driving apparatus 200. When a human operates the remote driving apparatus 200, the user of the remote driving apparatus 200 is this human, and when an AI operates the remote driving apparatus 200, the user of the remote driving apparatus 200 is a human (monitoring person) that monitors operations of the AI. An output unit 204 is used for outputting information from the remote driving apparatus 200 to the user. A storage unit 205 stores data used for operations of the remote driving apparatus 200. The storage unit 205 is realized by a storage apparatus such as a disk drive (for example, an HDD or an SSD). A communication unit 206 provides a function of the remote driving apparatus 200 communicating with another apparatus (for example, a vehicle to be remotely driven), and is realized by a network card or an antenna, for example.

Figure 3:
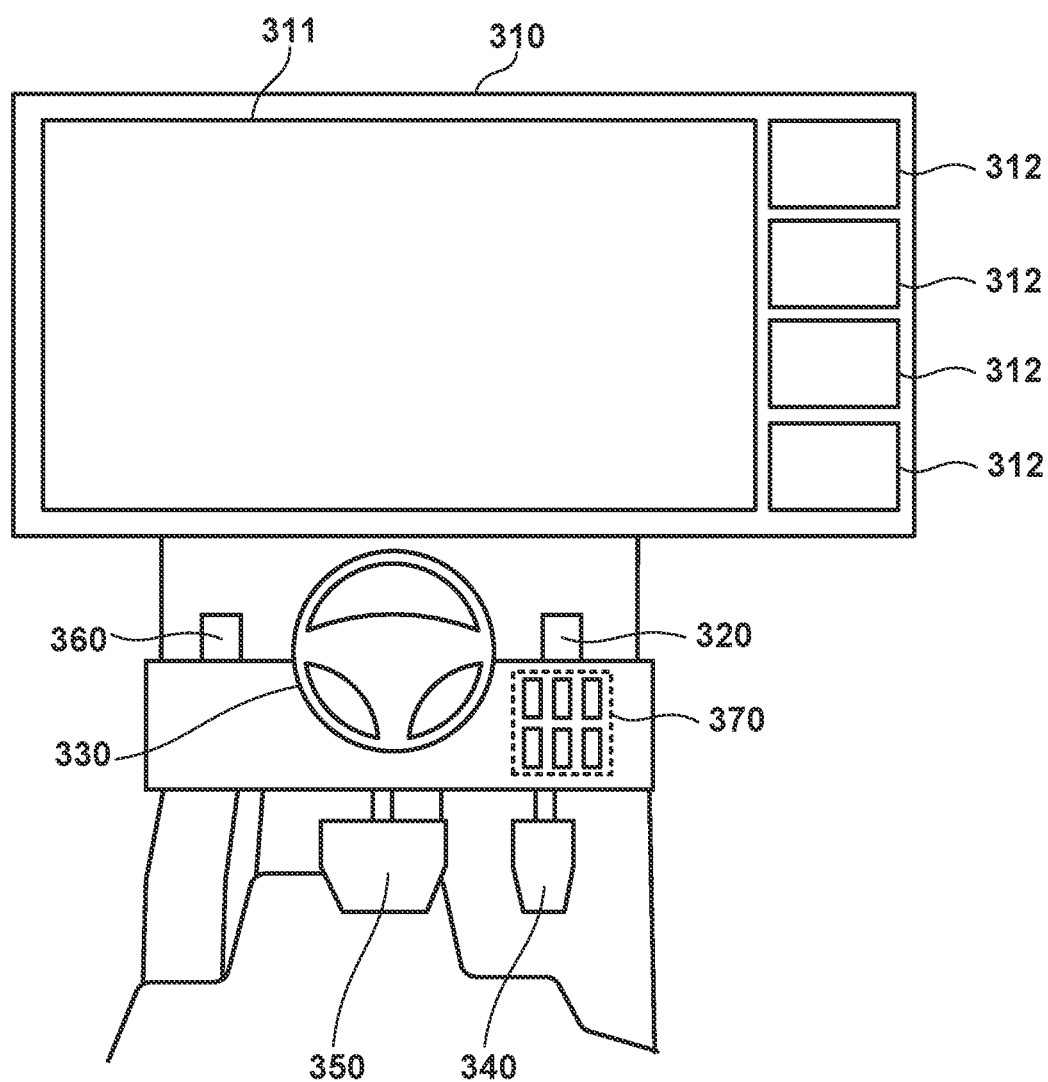
FIG. 3 is a schematic diagram illustrating a console example of remote driving according to an embodiment of the present invention.

A configuration example of the input unit 203 and the output unit 204 of the remote driving apparatus 200 will be described with reference to the schematic diagram in FIG. 3. In this configuration example, the output unit 204 is constituted by a display apparatus 310 and an acoustic apparatus 320, and the input unit 203 is constituted by a steering wheel 330, an accelerator pedal 340, a brake pedal 350, a microphone 360, and a plurality of switches 370.

The display apparatus 310 is an apparatus that outputs visual information for providing the remote driving service. The acoustic apparatus 320 is an apparatus that outputs audio information for providing the remote driving service. A screen displayed on the display apparatus 310 includes one main region 311 and a plurality of sub regions 312. Information regarding a vehicle to be controlled from among a plurality of vehicles to which the remote driving service is to be provided is displayed in the main region 311. The vehicle to be controlled is a vehicle to which an instruction from the remote driving apparatus 200 is transmitted. Information regarding a vehicle other than the vehicle to be controlled from among the plurality of vehicles to which the remote driving service is provided is displayed in each of the sub regions 312. A vehicle other than the vehicle to be controlled may be called a "vehicle to be monitored". When one remote driving apparatus 200 provides the remote driving service to a plurality of vehicles, the operator switches a vehicle displayed on the main region 311 (i.e., the vehicle to be controlled) as appropriate. Information displayed on the main region 311 and the sub regions 312 includes the traffic condition in the surrounding of the vehicle, the speed of the vehicle, and the like.

The steering wheel 330 is used for controlling the steering amount of the vehicle to be controlled, in the leading mode. The accelerator pedal 340 is used for controlling the accelerator pedal position of the vehicle to be controlled, in the leading mode. The brake pedal 350 is used for controlling the brake pedal position of the vehicle to be controlled, in the leading mode. The microphone 360 is used for inputting audio information. Audio information input to the microphone 360 is transmitted to the vehicle to be controlled, and is regenerated in the vehicle.

The plurality of switches 370 are used for inputting various types of instructions for providing the remote driving service. For example, the plurality of switches 370 include a switch for switching the vehicle to be controlled, a switch for performing an instruction of a determination result of the operator in the assisting mode, a switch for switching a plurality of operation modes, and the like.

The remote driving apparatus 200 described with reference to FIGS. 2 and 3 can provide both the leading mode and the assisting mode. Alternatively, the remote driving apparatus 200 can provide only one of the leading mode and the assisting mode. When the leading mode is not provided, the steering wheel 330, the accelerator pedal 340, and the brake pedal 350 can be omitted. In addition, the remote driving service may be provided by a plurality of remote driving apparatuses 200 in cooperation. A configuration may be adopted, in this case, a remote driving apparatuses 200 can take over a vehicle to which the service is to be provided, from another remote driving apparatus 200.

Figure 4:
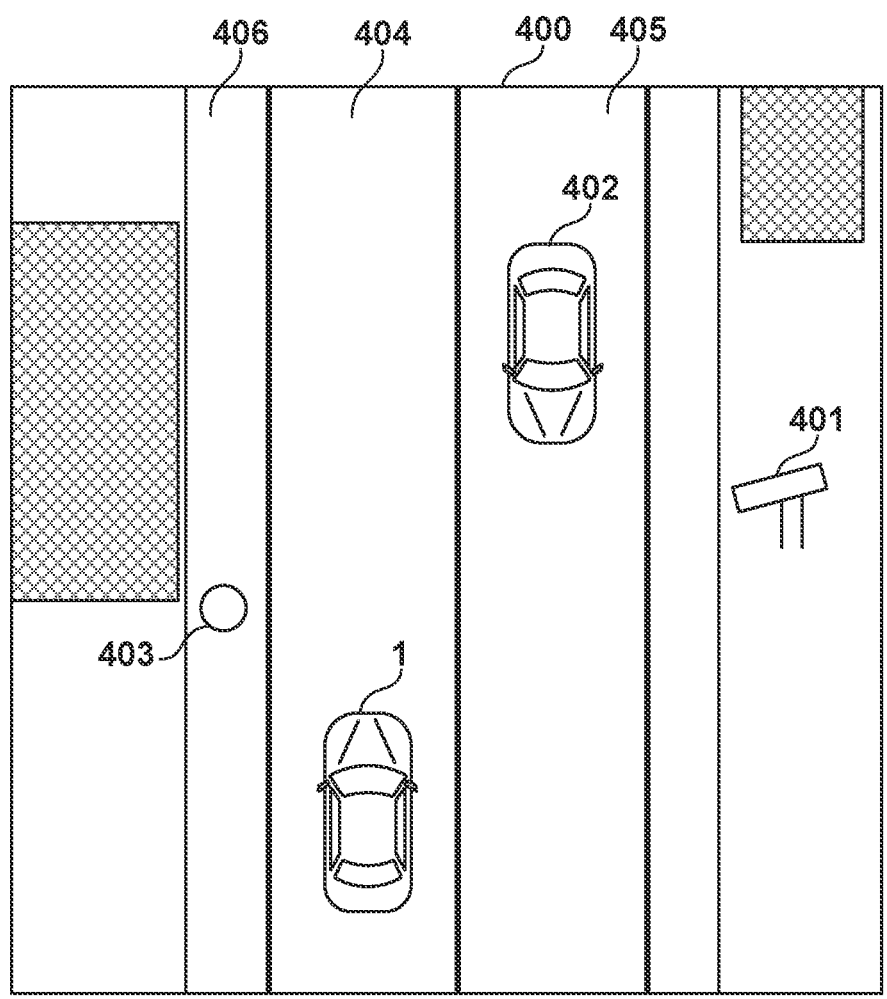
FIG. 4 is a schematic diagram illustrating a real environment around a vehicle according to an embodiment of the present invention.

An example of a real environment 400 (environment in the real world) around the vehicle 1 to be remotely driven will be described with reference to FIG. 4. Assume that the vehicle 1 is running on a traffic lane 404 in accordance with an operation instruction from the remote driving apparatus 200. An oncoming vehicle 402 is running on an oncoming lane 405 opposite to the traffic lane 404. The oncoming vehicle 402 may be manually driven by a driver, may be running using an automated driving function, or may be running using a remote driving service different from that of the remote driving apparatus 200. However, assume that the oncoming vehicle 402 is not operated by the remote driving apparatus 200.

A pedestrian 403 is walking on a sidewalk 406 adjacent to the traffic lane 404. A road management camera 401 is installed to shoot an image of the traffic lane 404 and the oncoming lane 405. The oncoming vehicle 402 and the pedestrian 403 are in the surroundings of the vehicle 1, and are examples of an object that is not to be operated by the remote driving apparatus 200. Hereinafter, an object that is not to be operated by the remote driving apparatus 200 is simply referred to as an "object". An object may or may not be movable. For example, pedestrians and other vehicles are movable objects. Guard rails, buildings, traffic lights, and the like are non-movable objects. Furthermore, a movable object may be an autonomously movable object. "Autonomously movable" refers to being able to move according to determination of the object itself. For example, a human, a vehicle that is being manually driven, a vehicle that is being driven in an automated manner are autonomously movable objects. On the other hand, a vehicle that is remotely driven is not moving according to determination made by the vehicle itself, and thus is not an autonomously movable object. "The surroundings of the vehicle 1" may refer to a range in which the detection units 41 to 43 of the vehicle 1 can perform detection, or a range in which display is performed as the surroundings of the vehicle 1, on the display apparatus 310 of the remote driving apparatus 200.

Figure 5:
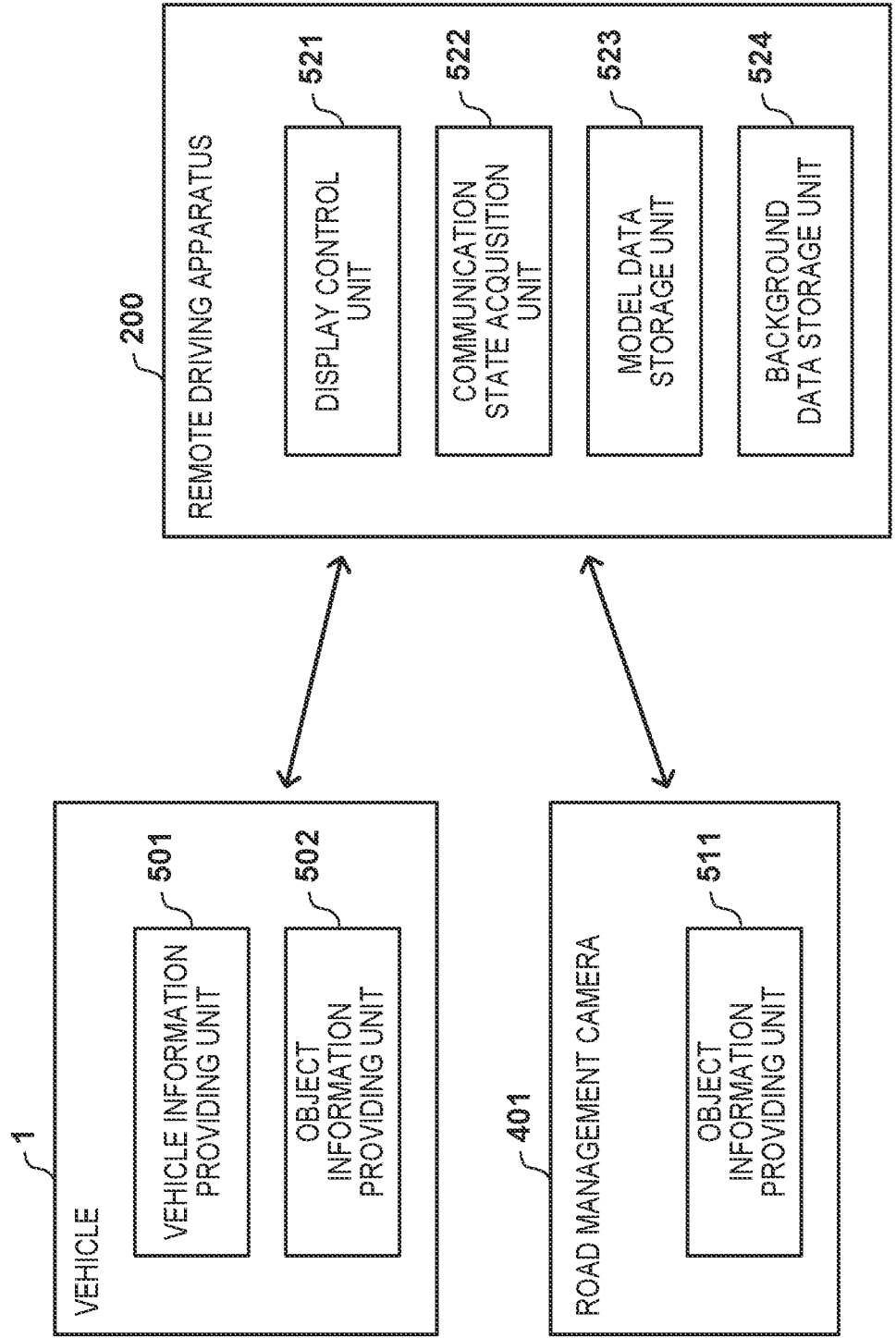
FIG. 5 is a block diagram illustrating a configuration example of a remote control system according to an embodiment of the present invention.

A configuration example of the remote control system will be described with reference to FIG. 5. In this example, the remote control system is constituted by the vehicle 1, the road management camera 401, and the remote driving apparatus 200. The road management camera 401 may be omitted. Functional blocks related to the embodiment to be described below from among the apparatuses of the remote control system will be described below.

The vehicle 1 includes a vehicle information providing unit 501 and an object information providing unit 502. Both those units may be realized by the ECU 20. The vehicle information providing unit 501 provides (for example, transmits) information regarding the vehicle 1 to the remote driving apparatus 200. The information regarding the vehicle 1 may include, for example, the current geographical location of the vehicle 1, the current speed and acceleration rate of the vehicle 1, identification information of the vehicle 1 in the remote driving service, and a future movement path recommended by the automated driving function. The geographical location of the vehicle 1 may be the geographical location of a representative point that represents the vehicle 1, or the geographical location of a region in the three-dimensional space occupied by the vehicle 1.

The object information providing unit 502 provides (for example, transmits) information regarding an object in the surroundings of the vehicle 1 to the remote driving apparatus 200. The information regarding an object may include, for example, a type of object, the current geographical location of the object, the speed and acceleration rate of the object, and a predicted future movement path of the object. The object information providing unit 502 determines the type and geographical location of the object based on sensor data of the object acquired by the detection units 41 to 43. Examples of the type of object include a standard-sized vehicle, a large-sized vehicle, a two-wheeled vehicle, an adult pedestrian, a child pedestrian, and a bicycle rider. The geographical location of an object may be the geographical location of a single point, or the geographical location of a region in the three-dimensional space occupied by the object. In addition, the object information providing unit 502 may calculate the speed and acceleration rate of the object based on the temporal change in the geographical location of the object. Furthermore, the object information providing unit 502 may generate a predicted future movement path of the object based on the geographical location, speed, and acceleration rate of the object. If the object is a vehicle, the object information providing unit 502 may generate a predicted future movement path of the object based further on the direction indicator, the driver's line of sight, and the like, and, if the object is a pedestrian or a bicycle rider, the object information providing unit 502 may generate a predicted future movement path of the object based further on their line of sight and the like. The data amount of information regarding an object is smaller than the data amount of sensor data (for example, a visible light image, a radar image, and a LIDAR image) of the object acquired by the detection unit 41 to 43. The vehicle 1 may receive information regarding the object from the object when communication with the object (for example, inter-vehicle communication) is possible.

The road management camera 401 is an example of an apparatus that acquires information regarding an object other than the vehicle 1 to be operated. The road management camera 401 includes an object information providing unit 511. The object information providing unit 511 is similar to the object information providing unit 502, and thus a description thereof is omitted.

The remote driving apparatus 200 includes a display control unit 521, a communication state acquisition unit 522, a model data storage unit 523, and a background data storage unit 524. The display control unit 521 and the communication state acquisition unit 522 are realized by the processor 201, for example. The model data storage unit 523 and the background data storage unit 524 are realized by the memory 202, for example.

The display control unit 521 performs display control related to the vehicle 1. This display control will be described later in detail. The communication state acquisition unit 522 acquires the communication state between the vehicle 1 and the remote driving apparatus 200 and the communication state between the road management camera 401 and the remote driving apparatus 200. Each of the communication states includes a communication quality (delay and the like), for example. The communication state may be acquired directly from the vehicle 1 or the road management camera 401, or may be acquired from the communication system that provides the communication service to theses apparatuses.

The model data storage unit 523 stores data regarding models of the vehicle 1 and objects. For example, the model data storage unit 523 stores three-dimensional model data for each of the above-described types of object. The background data storage unit 524 stores data (for example, map data) regarding fixed structures (roads, buildings, etc.) in the environment in which the vehicle 1 may be present. As will be described later, a fixed structure that exists in the surroundings of the geographical location of the vehicle 1 is displayed as a portion of the background. Background data includes the geographical location and three-dimensional model data of each fixed structure. Information regarding a movable object is not stored in the background data storage unit 524, and thus is acquired from the vehicle 1 and the like by the remote driving apparatus 200. On the other hand, the remote driving apparatus 200 may also read out information regarding a non-movable object from the background data storage unit 524, or may also acquire the information from the vehicle 1 and the like.

Figure 6:
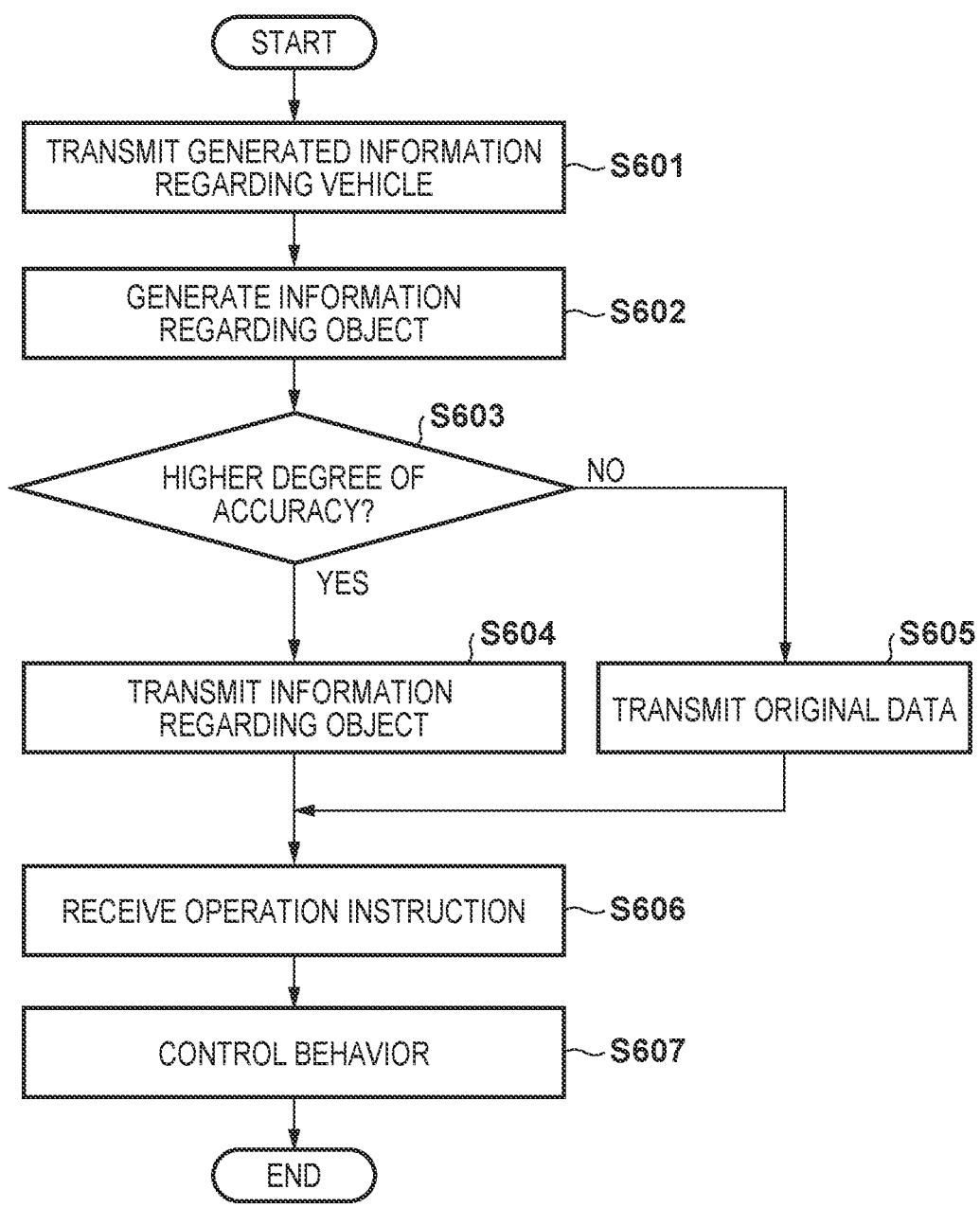
FIG. 6 is a flowchart illustrating an example of a control method of a vehicle according to an embodiment of the present invention.

An example of a control method of the vehicle 1 in the remote control system will be described with reference to FIG. 6. This method may be performed as a result of the processor 20*a* of the vehicle 1 or the like executing a program stored in the memory 20*b* or the like. Alternatively, some or all of the processes of the method may be executed by a dedicated circuit such as an ASIC (application specific integrated circuit). In the former case, the processor serves as a constituent element for a specific operation, and, in the latter case, the dedicated circuit serves as a constituent element for a specific operation. The control method in FIG. 6 is repeatedly executed while the vehicle 1 is executing the remote operation function.

In step S601, the vehicle 1 (specifically, the vehicle information providing unit 501) acquires information regarding the vehicle 1, and provides the acquired information to the remote driving apparatus 200. In step S602, the vehicle 1 (specifically, the object information providing unit 502) generates information regarding an object in the surroundings of the vehicle 1.

In step S603, the vehicle 1 (specifically, the object information providing unit 502) determines whether or not the generated information satisfies a predetermined degree of accuracy. If the information satisfies the predetermined degree of accuracy ("YES" in step S603), the vehicle 1 advances the procedure to step S604, and otherwise ("NO" in step S603), the vehicle 1 advances the procedure to step S605. The predetermined degree of accuracy is a degree of accuracy to which an operation performed by the operator is not obstructed in the remote driving service, for example.

In step S604, the vehicle 1 (specifically, the object information providing unit 502) provides the information regarding the object to the remote driving apparatus 200. In step S605, the vehicle 1 (specifically, the object information providing unit 502) provides, to the remote driving apparatus 200, original data for generating information regarding the object. If accurate information cannot be provided to the remote driving apparatus 200, the vehicle 1 provides original data to the remote driving apparatus 200 in this manner. The remote driving apparatus 200 may have a processing capability higher than the vehicle 1, and thus can generate more accurate information than the vehicle 1.

In step S606, the vehicle 1 (specifically, the object information providing unit 502) receives an operation instruction related to remote driving, from the remote driving apparatus 200. In step S607, the vehicle 1 (specifically, the ECU 20) controls behavior of the vehicle 1 in accordance with the operation instruction. The operation in steps S606 and S607 may be similar to those of conventional remote driving, and a detailed description thereof is omitted.

The road management camera 401 (specifically, the object information providing unit 511) performs operations similar to those in steps S602 to S605 in FIG. 6.

Figure 7:
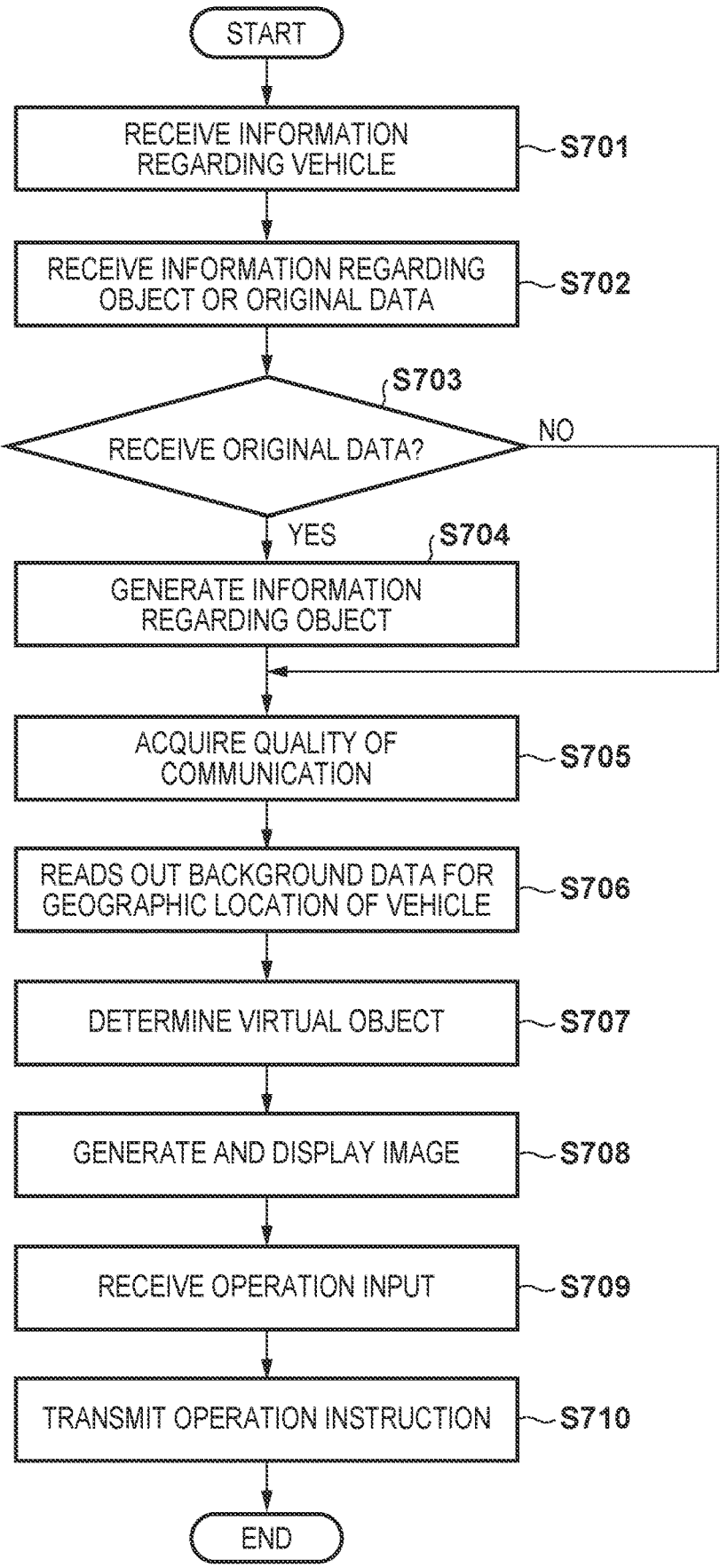
FIG. 7 is a flowchart illustrating an example of a control method of a remote driving apparatus according to an embodiment of the present invention.

An example of a control method of the remote driving apparatus 200 in remote control system will be described with reference to FIG. 7. This method may be performed as a result of the processor 201 of the remote driving apparatus 200 executing a program stored in the memory 202. Alternatively, some or all of the processes of the method may be executed by a dedicated circuit such as an ASIC (application specific integrated circuit). In the former case, the processor serves as a constituent element for a specific operation, and, in the latter case, the dedicated circuit serves as a constituent element for a specific operation. The control method in FIG. 7 is executed repeatedly while the remote driving apparatus 200 is providing the remote driving service.

In step S701, the remote driving apparatus 200 receives information regarding the vehicle 1 to be subjected to remote driving, the information having been transmitted in step S601. Information included in this information is as described above. In step S702, the remote driving apparatus 200 receives the information regarding the object transmitted in step S604 or the original data transmitted in step S605. Such information and data may be received from the vehicle 1, or may also be received from the road management camera 401.

In step S703, the remote driving apparatus 200 determines whether or not original data was received in step S702. If original data was received ("YES" in step S703), the remote driving apparatus 200 executes step S704, and then advances the procedure to step S705, and otherwise ("NO" in step S703) the remote driving apparatus 200 advances the procedure directly to step S705.

In step S704, the remote driving apparatus 200 generates information regarding the object from the original data. A method for generating information regarding an object may be similar to that in the above step S602. The performance of the remote driving apparatus 200 is higher than that of the vehicle 1 and the road management camera 401, and thus can generate more accurate information.

In step S705, the remote driving apparatus 200 (specifically, the communication state acquisition unit 522) acquires the quality of communication between the vehicle 1 and the remote driving apparatus 200 and the quality of communication between the road management camera 401 and the remote driving apparatus 200.

In step S706, the remote driving apparatus 200 (specifically, the display control unit 521) reads out data (for example, map data) regarding the geographical location of the vehicle 1 and fixed structures in the surroundings of the vehicle 1, from the background data storage unit 524. For example, the remote driving apparatus 200 reads out map data as seen by the driver of the vehicle 1, from the background data storage unit 524.

In step S707, the remote driving apparatus 200 (specifically, the display control unit 521) determines a virtual object for representing the object, based on the type of the object included in the information regarding this object. For example, when the type of object is a standard-sized vehicle, the remote driving apparatus 200 performs determination to use a virtual object of a standard-sized vehicle in order to represent this object. Furthermore, the remote driving apparatus 200 may also determine a display size of the virtual object based on the geographical location of the object (i.e., a region occupied in the three-dimensional space).

In step S708, the remote driving apparatus 200 (specifically, the display control unit 521) generates an image that indicates the real environment around the vehicle 1, and displays the image on the display apparatus 310 (in the main region 311, for example). Specifically, the remote driving apparatus 200 displays the virtual object determined in step S707, at a display position corresponding to the geographical location of the object, in the background data read out in step S706. This virtual object may be a model corresponding to the type of the object from among a plurality of models stored in the model data storage unit 523. Specific examples of the image will be described later.

In step S709, the remote driving apparatus 200 receives an operation input from the operator. In step S710, the remote driving apparatus 200 generates an operation instruction to the vehicle 1, based on the received operation input, and transmits this operation instruction to the vehicle 1.

An example of an image 800 that is generated in step S708 will be described with reference to FIG. 8. The image 800 virtually expresses the real environment 400 in FIG. 4. A virtual object 810 is a virtual object that represents the oncoming vehicle 402. A three-dimensional model of a vehicle is used as the virtual object. A virtual object 820 is a virtual object that represents the pedestrian 403. A three-dimensional model of an adult is used as the virtual object. These virtual objects are displayed in a map as seen by the driver of the vehicle 1, at display positions corresponding to the geographical locations of the objects. In the example in FIG. 8, a map as seen by the driver of the vehicle 1 is displayed, but, alternatively, a map in a viewpoint when the vehicle 1 is viewed from behind may be displayed. In this case, the remote driving apparatus 200 may also display, in the image 800, a virtual object that represents the vehicle 1.

In the image 800, a past movement path of the oncoming vehicle 402 is indicated by a solid line 811, and a predicted future movement path of the oncoming vehicle 402 is indicated by a broken line 812. The remote driving apparatus 200 generates a past movement path of the oncoming vehicle 402 based on past geographical locations of the oncoming vehicle 402. In order to generate a past movement path, the remote driving apparatus 200 may store most recent geographical locations of the oncoming vehicle 402 for a certain time period (for example, for 5 seconds). A predicted future movement path of the oncoming vehicle 402 is received in step S702, or generated in step S704, and is acquired. Similarly, in the image 800, a past movement path of the pedestrian 403 is indicated by a solid line 821, and a predicted future movement path of the pedestrian 403 is indicated by a broken line 822.

In the image 800, predicted future movement paths of the vehicle 1 are indicated by broken lines 831L and 831R. The broken line 831L indicates a predicted movement path of the left edge of the vehicle 1, and the broken line 831R indicates a predicted movement path of the right edge of the vehicle 1. By indicating the predicted movement paths of the two edges in this manner, the operator of the remote driving apparatus 200 easily recognizes the width of the vehicle 1. In addition, a recommended movement path 832 of the vehicle 1 generated by the automated driving function of the vehicle 1 is also displayed in the image 800.

Figure 8:
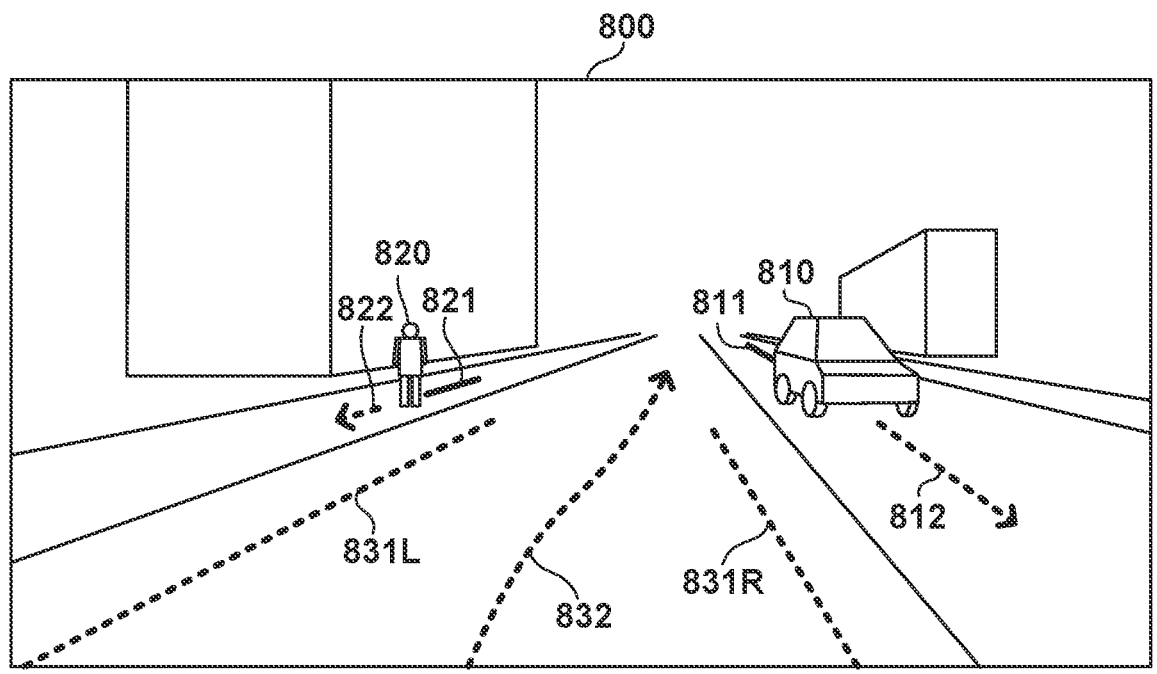
FIG. 8 is a diagram illustrating an example of a display image of a remote driving apparatus according to an embodiment of the present invention.
Figure 9:
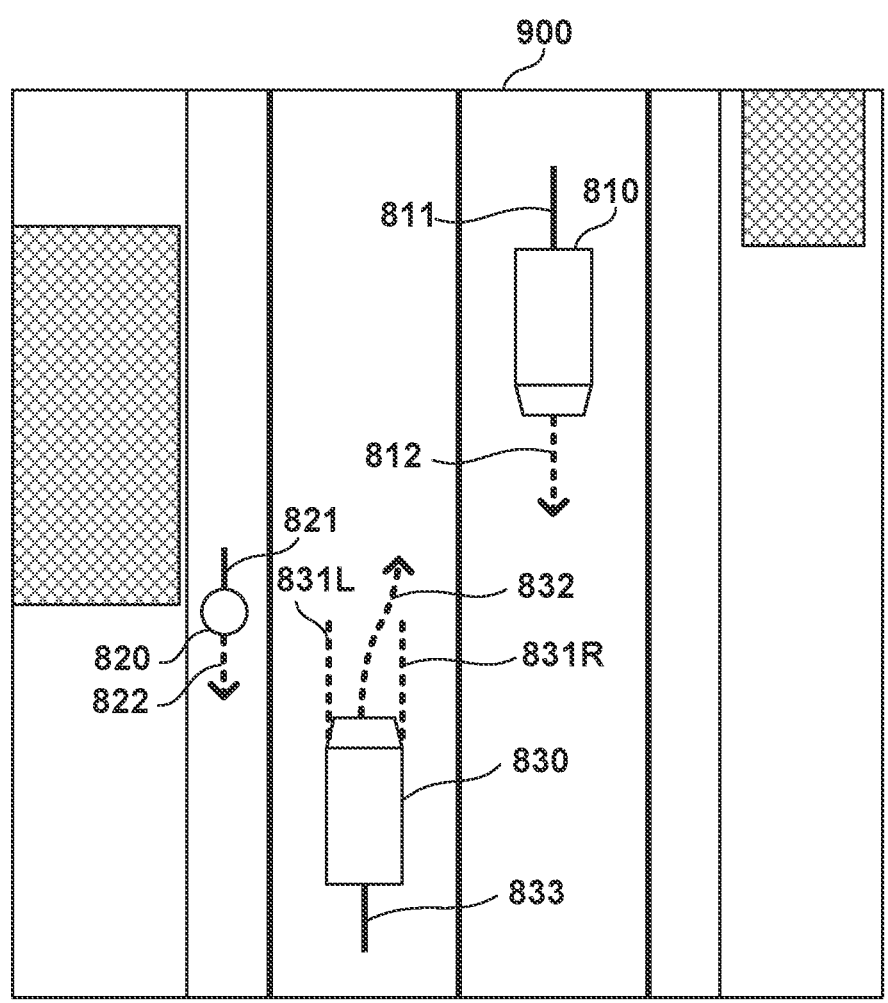
FIG. 9 is a diagram illustrating an example of a display image of a remote driving apparatus according to an embodiment of the present invention.

The remote driving apparatus 200 may display an image 900 in FIG. 9 in place of/in addition to the image 800 on FIG. 8. The image 900 is a bird's-eye diagram of the geographical location of the vehicle 1 and the surroundings thereof. Similarly to FIG. 8, the virtual objects 810 and 820 are displayed in a map. In the image 900, a virtual object 830 that represents the vehicle 1 and a solid line 833 that indicates a past movement path of the vehicle 1 are additionally displayed. The display size of the virtual object 830 is determined according to the size of the vehicle 1. The size of the vehicle 1 may be received from the vehicle 1 in step S701, or may be stored in the memory 202 in advance. The remote driving apparatus 200 may hide all of the solid lines 811, 821, and 832 and the broken lines 812, 822, 831L, and 832R that indicate past or future movement paths, or may display only some of the lines.

The above-described virtual objects in the images 800 and 900 may be arranged at display positions corresponding to the geographical locations when the information regarding the vehicle 1 and the information regarding the objects were acquired. However, if communication between the remote driving apparatus 200 and the vehicle 1 or communication between the remote driving apparatus 200 and the road management camera 401 delays largely, the difference between the real environment of the vehicle 1 and display content in the remote driving apparatus 200 is large. Furthermore, a delay until an operation instruction transmitted from the remote driving apparatus 200 reaches the vehicle 1 also needs to be taken into consideration.

In view of this, in some embodiments, the remote driving apparatus 200 may determine a display position of a virtual object in consideration of a delay that occurs when acquiring information from the vehicle 1 or the road management camera 401. Furthermore, the remote driving apparatus 200 may also determine a display position of a virtual object in further consideration of a delay that occurs when an operation instruction is provided from the remote driving apparatus 200 to the vehicle 1.

Figure 10:
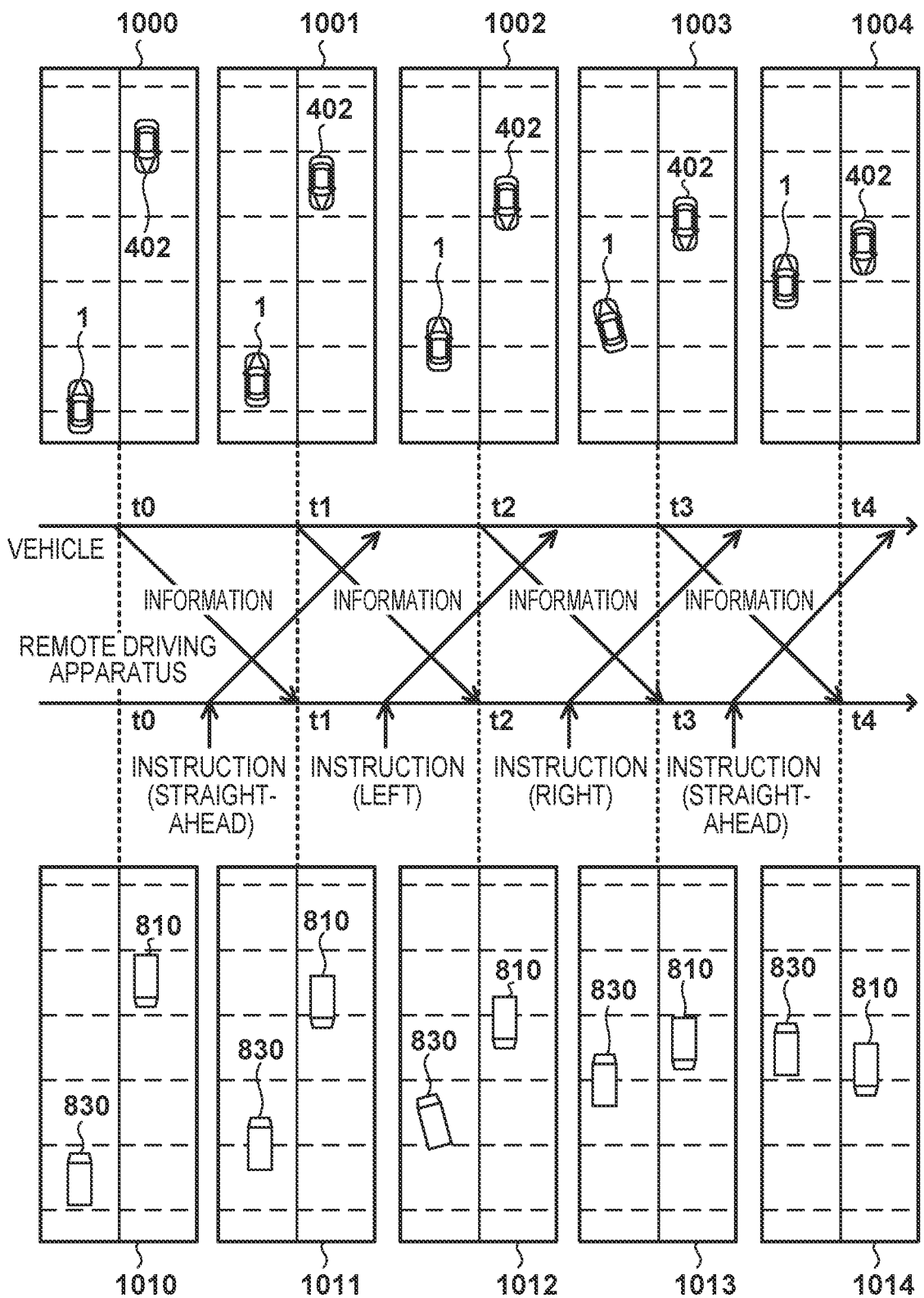
FIG. 10 is a schematic diagram illustrating a method for taking a delay into consideration according to an embodiment of the present invention.

A method in which the remote driving apparatus 200 takes a delay into consideration will be described with reference to FIG. 10. Real environments 1000 to 1004 respectively indicate real environments around the vehicle 1 at a time t0 to a time t4. Images 1010 to 1014 respectively indicate the positions of the virtual objects 810 and 830 displayed on the display apparatus 310 of the remote driving apparatus 200 at the times t0 to t4. The times t0 to t4 are set at evenly spaced time intervals. In order to easily understand the positional relation between the vehicle 1 and the oncoming vehicle 402, and the positional relation between the virtual objects 810 and 830, broken lines are added in the width direction of the traffic lane. Hereinafter, in order to simplify the description, assume that a time required for transmission of information from the vehicle 1 to the remote driving apparatus 200 and a time required for transmission of an operation instruction from the remote driving apparatus 200 to the vehicle 1 are the same (a time equal to an interval between the time t0 and the time t1). In addition, assume that an instruction from the operator is an instruction related to steering. Instructions related to acceleration/deceleration and other behaviors can also be handled by the following method.

Information that includes the geographical locations of the vehicle 1 and the oncoming vehicle 402 at the time t0 is received by the remote driving apparatus 200 at the time t1. If the remote driving apparatus 200 determines display positions of the virtual objects 810 and 830 that represent the vehicle 1 and the oncoming vehicle 402 based on this information, it indicates that the user of the remote driving apparatus 200 references a past real environment. In addition, an operation instruction transmitted from the remote driving apparatus 200 between the time t0 and the time t1 is received by the vehicle 1 between the time t1 and a time t2, and is reflected on the behavior of the vehicle 1. Therefore, behavior of the vehicle 1 is not performed at a timing intended by the operator.

In view of this, the remote driving apparatus 200 predicts future geographical locations of the vehicle 1 and the oncoming vehicle 402, and determines display positions of the virtual objects 810 and 830 that represent the vehicle 1 and the oncoming vehicle 402. The image 1012 generated by the remote driving apparatus 200 at the time t2 will be described in detail. First, a display position of the virtual object 810 that represents the oncoming vehicle 402 will be described. At the time t2, the remote driving apparatus 200 acquires the geographical location of the oncoming vehicle 402 at the time t1 and a predicted movement path of the oncoming vehicle 402 at this point of time. In addition, an instruction transmitted by the remote driving apparatus 200 at the time t2 is processed by the vehicle 1 at the time t3. In view of this, the remote driving apparatus 200 determines a display position of the virtual object 810 in the image 1012 to correspond to the geographical location of the oncoming vehicle 402 at the time t3 indicated in the predicted movement path of the oncoming vehicle 402 transmitted at the time t1.

Next, a display position of the virtual object 830 that represents the vehicle 1 will be described. At the time t2, the remote driving apparatus 200 acquires the geographical location of the vehicle 1 at the time t1. In addition, operation instructions input by the operator by the time t0 are reflected on the geographical location of the vehicle 1 at the time t1. In view of this, the remote driving apparatus 200 determines a display position of the virtual object 830 in the image 1012 to correspond to a geographical location obtained by carrying out operator's operation instructions that have been input to the remote driving apparatus 200 from the times t0 to t2, regarding the geographical location of the vehicle 1 at the time t1. The display positions of the virtual objects 810 and 830 in the image 1012 generated in this manner correspond to the geographical locations of the oncoming vehicle 402 and the vehicle 1 in the real environment 1003 at the time t3. According to such a method, even if a delay occurs, the operator of the remote driving apparatus 200 can remotely drive the vehicle 1 with an operability feeling similar to that when directly driving the vehicle 1.

Figure 11:
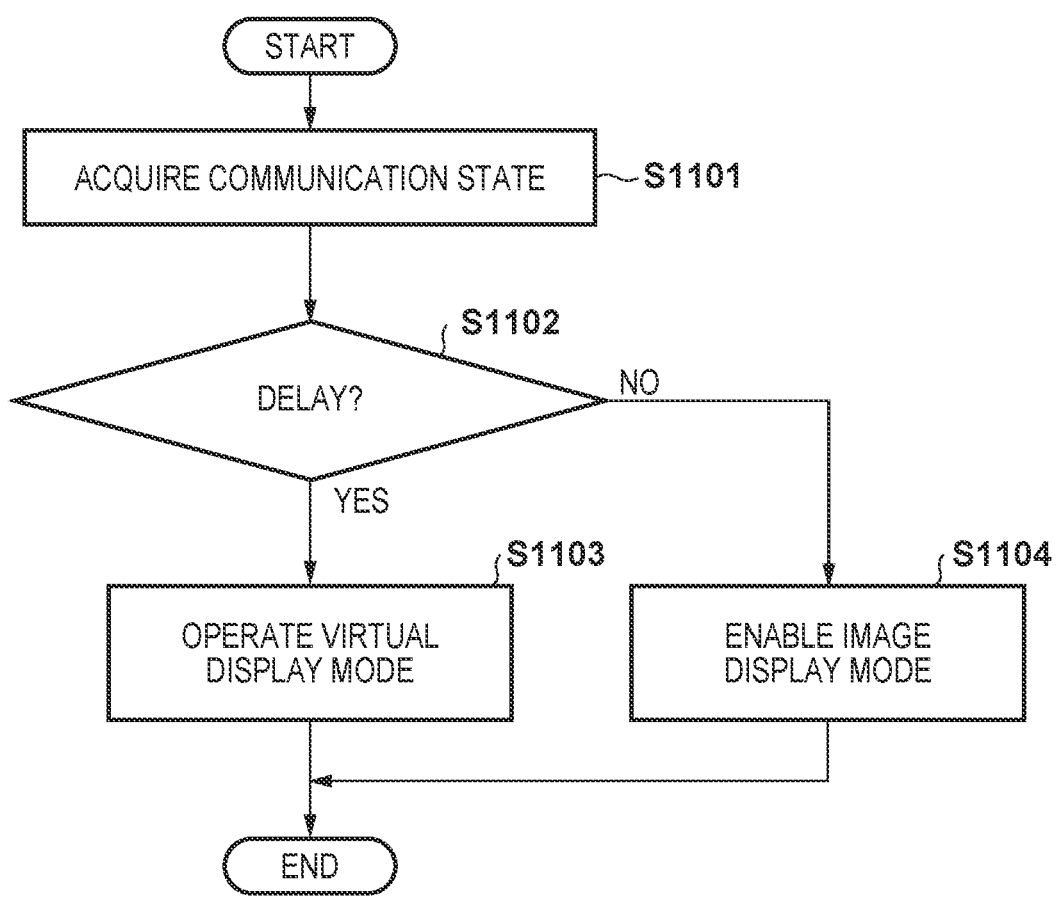
FIG. 11 is a flowchart illustrating an example of a control method of a remote driving apparatus according to an embodiment of the present invention.

A display mode select operation of the remote driving apparatus 200 in the remote control system will be described with reference to FIG. 11. This operation may be performed as a result of the processor 201 of the remote driving apparatus 200 executing a program stored in the memory 202. Alternatively, some or all of the processes of the method may be executed by a dedicated circuit such as an ASIC (application specific integrated circuit). In the former case, the processor serves as a constituent element for a specific operation, and, in the latter case, the dedicated circuit serves as a constituent element for a specific operation. The control method in FIG. 11 is executed repeatedly while the remote driving apparatus 200 is providing the remote driving service.

In some embodiments, the remote driving apparatus 200 can select one mode from a plurality of display modes, and generate an image for remotely operating the vehicle 1. The plurality of display modes may include a virtual display mode in which display related to an object is performed using a virtual object as described above, and an image display mode in which display related to an object is performed using an image obtained by the vehicle 1. The communication amount necessary in the virtual display mode is smaller than the communication amount necessary in the image display mode. In view of this, a configuration is adopted in which, when the communication state is not good, the remote driving apparatus 200 prevents an operator from selecting the image display mode, and display control is performed in the virtual display mode. A specific operation will be described below.

In step S1101, the remote driving apparatus 200 acquires the quality of communication between the vehicle 1 and the remote driving apparatus 200. The communication state may be acquired directly from the vehicle 1 or the road management camera 401, or may be acquired from the communication system that provides the communication service to these apparatuses.

In step S1102, the remote driving apparatus 200 determines, based on the communication state, whether or not a delay that is longer than or equal to a threshold is predicted. If a delay is predicted ("YES" in step S1102), the remote driving apparatus 200 advances the procedure to step S1103, and otherwise ("NO" in step S1102) the remote driving apparatus 200 advances the procedure to step S1104.

In step S1103, the remote driving apparatus 200 prohibits execution of the image display mode, and performs display control in the virtual display mode. In step S1104, the remote driving apparatus 200 can select either the image display mode or virtual display mode. The remote driving apparatus 200 displays an image for remotely driving the vehicle 1 in one of the modes, in accordance with selection by the operator.

Figure 12:
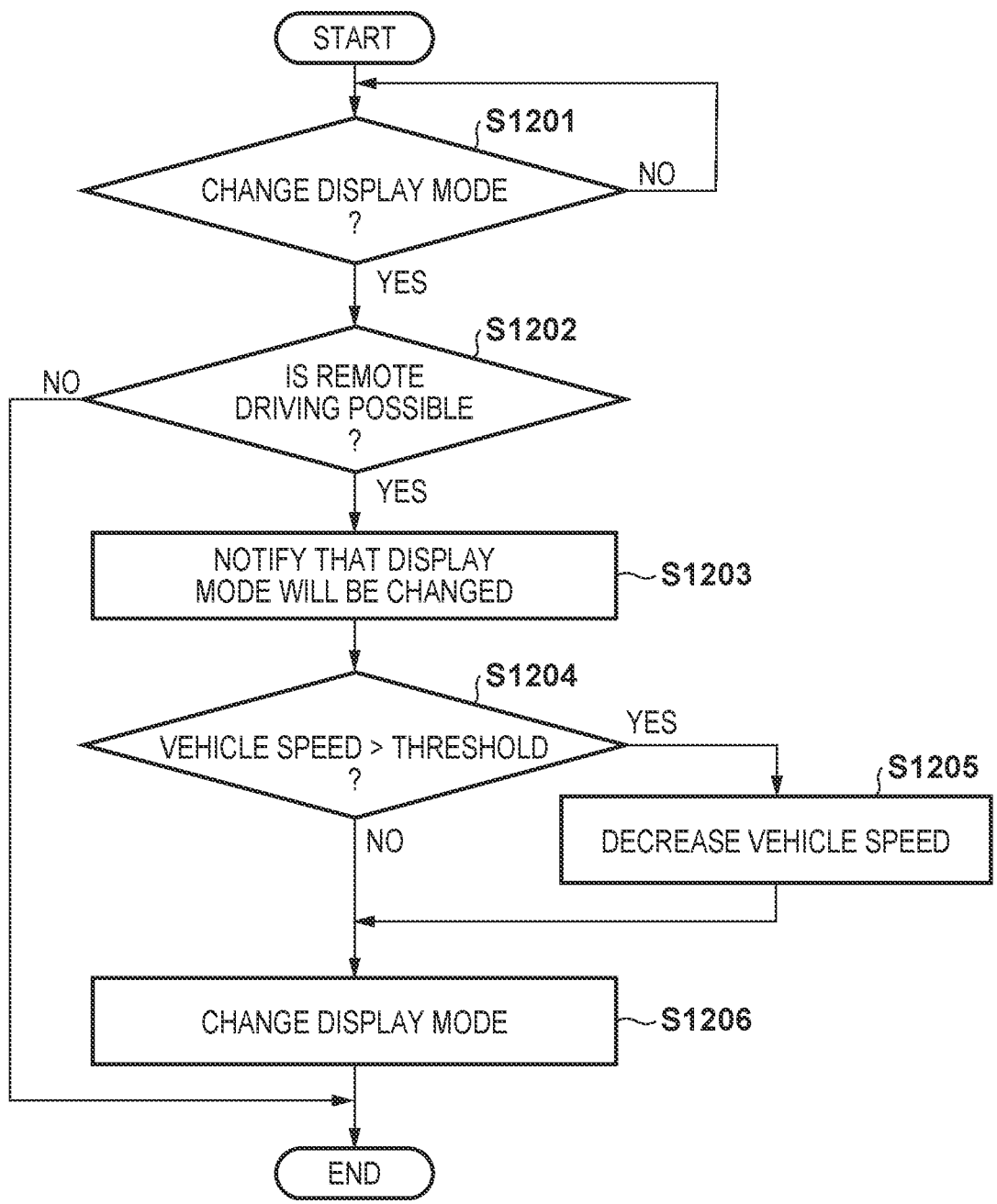
FIG. 12 is a flowchart illustrating an example of a control method of a remote driving apparatus according to an embodiment of the present invention.

A display mode change operation of the remote driving apparatus 200 in the remote control system will be described with reference to FIG. 12. This operation may be performed as a result of the processor 201 of the remote driving apparatus 200 executing a program stored in the memory 202. Alternatively, some or all of the processes of the method may be performed by a dedicated circuit such as an ASIC (application specific integrated circuit). In the former case, the processor serves as a constituent element for a specific operation, and, in the latter case, the dedicated circuit serves as a constituent element for a specific operation. The control method in FIG. 12 is executed repeatedly while the remote driving apparatus 200 is providing the remote driving service.

In step S1201, the remote driving apparatus 200 determines whether or not to change the display mode. If the display mode is to be changed ("YES" in step S1201), the remote driving apparatus 200 advances the procedure to step S1202, and otherwise ("NO" in step S1201) the remote driving apparatus 200 repeats step S1201. The remote driving apparatus 200 may determine whether or not to change the display mode in accordance with an instruction from the user. In addition, the remote driving apparatus 200 may determine whether or not to change the display mode, for example, in accordance with a change in the communication quality. As described with reference to FIG. 11, if the communication quality deteriorates while the image display mode is selected, the remote driving apparatus 200 determines that the display mode is to be changed to the virtual display mode. Furthermore, if the communication quality improves while the virtual display mode is selected, the remote driving apparatus 200 may determine that the display mode is to be changed to the image display mode.

In step S1202, the remote driving apparatus 200 determines whether or not remote driving can be performed. If remote driving can be performed ("YES" in step S1202), the remote driving apparatus 200 advances the procedure to step S1203, and otherwise the remote driving apparatus 200 ends the procedure. As described with reference to FIG. 11, there are cases where the display mode is changed due to deterioration in the communication quality. In view of this, in this step, the remote driving apparatus 200 determines whether or not remote driving can still be executed, in other words, whether or not an operation instruction can be provided from the remote driving apparatus 200 to the vehicle 1. When remote driving cannot be executed, the remote driving apparatus 200 may notify the user of the remote driving apparatus 200 that remote driving cannot be executed.

In step S1203, the remote driving apparatus 200 notifies the user of the remote driving apparatus 200 that the display mode is to be changed. If the display mode is changed according to a user's instruction, this notification may be notification that a change instruction has been accepted. If the display mode is changed according to determination by the remote driving apparatus 200, this notification may be notification that the display mode is to be changed according to determination by the remote driving apparatus 200. Furthermore, as will be described in the following steps, the remote driving apparatus 200 may notify the user of the remote driving apparatus 200 that the speed of the vehicle 1 is to be decreased as necessary.

In step S1204, the remote driving apparatus 200 determines whether or not the speed of the vehicle 1 is higher than a threshold speed. If the speed of the vehicle 1 is higher than the threshold speed ("YES" in step S1204), the remote driving apparatus 200 advances the procedure to step S1205, and otherwise the remote driving apparatus 200 advances the procedure to step S1206. The threshold speed may be individually set according to the situation of the vehicle 1. For example, when the vehicle 1 is running on a highway, the threshold speed may be 80 km/hour. When the vehicle 1 is running on a public road, the threshold speed may be 30 km/hour.

In step S1205, the remote driving apparatus 200 decreases the speed of the vehicle 1 to the threshold speed or lower. There are cases where a time lag occurs for changing the display mode. In addition, there is the possibility that the user of the remote driving apparatus 200 is confused due to a change in the display mode. In view of this, the remote driving apparatus 200 changes the display mode in an even safer situation, by reducing the speed of the vehicle 1 to the threshold speed or lower, in consideration of such a delay and confusion. In other words, the remote driving apparatus 200 reduces the speed of the vehicle 1 before the display mode is changed. Furthermore, in other words, the remote driving apparatus 200 changes the display mode on the condition that the speed of the vehicle 1 is lower than or equal to the threshold speed. In step S1206, the remote driving apparatus 200 changes the display mode.

In the above embodiment, a case has been described in which an operation target of the remote driving apparatus 200 is the vehicle 1. The operation target according to the present invention is not limited to the vehicle 1. For example, the operation target may also be a mobile object other than a vehicle, for example, a robot that guides farm animals such as sheep and cows in a grass farm, in place of a sheepdog. If the operation target is a farm animal guiding robot, an object is a farm animal. Furthermore, the operation target may also be an apparatus other than a mobile object, for example, a traffic guiding robot used at a fixed position. If the operation target is a traffic guiding robot, an object is a vehicle. If the operation target is not a vehicle, the remote driving apparatus 200 can be generally called a remote control apparatus.

Overview of Embodiments

Configuration 1

A control apparatus (200) for remotely operating an operation target (1), the apparatus comprising:

an acquisition unit configured to acquire information regarding an object (402, 403) that exists in the surroundings of the operation target, and is not to be operated by the control apparatus, from an information providing unit (502, 511) outside of the control apparatus (step S702);

a determination unit configured to determine a virtual object (810, 820) for representing the object, based on the information regarding the object (step S707); and a display control unit configured to display the virtual object at a display position corresponding to a geographical location of the object (step S708).

According to this configuration, an image for a remote operation can be generated based on the information regarding the object, and thus it is not necessary to receive an image of the object itself, and the communication amount is reduced.

Configuration 2

The control apparatus according to configuration 1, wherein the acquisition unit acquires, as the information regarding the object, a type and geographical location of the object determined by the information providing unit.

According to this configuration, a virtual object can be determined based on the type and geographical location of the object.

Configuration 3

The control apparatus according to configuration 2, wherein the display control unit displays, as the virtual object, a model (810, 820) corresponding to the type of the object from among a plurality of models.

According to this configuration, a virtual object can be displayed using a model.

Configuration 4

The control apparatus according to any one of configurations 1 to 3, wherein the operation target is a mobile object (1).

According to this configuration, it is possible to control an operation of a mobile object.

Configuration 5

The control apparatus according to any one of configurations 1 to 4, wherein the display control unit further displays at least one of a past movement path (833) of the operation target, a predicted future movement path (831L, 831R) of the operation target, a past movement path (811, 821) of the object, and/or a predicted future movement path (812, 822) of the object.

According to this configuration, the user of the control apparatus easily understands behaviors of an operation target and an object.

Configuration 6

The control apparatus according to configuration 5, wherein the information providing unit generates a predicted future movement path (812, 822) of the object based on a geographical location, speed, and acceleration rate of the object, and provides the predicted movement path to the control apparatus.

According to this configuration, an external apparatus generates a predicted movement path, and thus it is not necessary for the control apparatus to acquire original data.

Configuration 7

The control apparatus according to configuration 6, wherein, when it is not possible to provide information regarding the object so as to satisfy a predetermined degree of accuracy, the information providing unit provides original data for generating the information, to the control apparatus (step S605).

According to this configuration, the control apparatus can refer to original data as necessary.

Configuration 8

The control apparatus according to configuration 6 or 7, wherein the information providing unit is included in the operation target (502).

According to this configuration, it is possible to acquire information regarding an object generated by an operation target.

Configuration 9

The control apparatus according to any one of configurations 1 to 8, wherein the display control unit determines a display position of the virtual object in consideration of a delay that occurs when the information is acquired from the information providing unit.

According to this configuration, it is possible to remotely operate an operation target, with an operability feeling similar to that of an operation in the real environment.

Configuration 10

The control apparatus according to configuration 9, further comprising a providing unit configured to provide an operation instruction to the operation target (step S710), wherein the display control unit determines the display position of the virtual object, in further consideration of a delay that occurs when the operation instruction is provided from the providing unit to the operation target.

According to this configuration, an operation performed by the control apparatus can be reflected on an operation target at an appropriate point of time.

Configuration 11

The control apparatus according to any one of configurations 1 to 10, wherein the display control unit can select a display mode from a plurality of display modes that include a first display mode in which display related to the object is performed using the virtual object and a second display mode in which display related to the object is performed using an image obtained by the operation target (step S1104).

According to this configuration, a display mode can be selected according to a communication state.

Configuration 12

The control apparatus according to configuration 11, wherein, when the display mode is to be changed (step S1201), the display control unit notifies a user of the control apparatus that the display mode is to be changed (step S1203).

According to this configuration, the user of the remote driving apparatus can be aware of a change in the display mode in advance.

Configuration 13

The control apparatus according to configuration 11 or 12, wherein the display control unit decreases a movement speed of the operation target, before the display mode is changed (step S1205).

According to this configuration, it is possible to suppress influence of a time lag that can occur due to a change in the display mode.

Configuration 14

The control apparatus according to any one of configurations 11 to 13, wherein the display control unit changes the display mode (step S1206) on a condition that a movement speed of the operation target is lower than or equal to a threshold speed (step S1204).

According to this configuration, it is possible to suppress influence of a time lag that can occur due to a change in the display mode.

Configuration 15

The control apparatus according to any one of configurations 11 to 14, wherein the display control unit selects a display mode based on a communication state between the information providing unit and the control apparatus (steps S1101 to S1104).

According to this configuration, a display mode can be selected according to a communication state.

Configuration 16

The control apparatus according to configuration 15, wherein, if a delay that is larger than or equal to a threshold is predicted based on the communication state, the display control unit selects the first display mode (step S1103).

According to this configuration, an appropriate display mode can be selected according to a delay.

Configuration 17

The control apparatus according to any one of configurations 1 to 16, wherein the display control unit further displays a virtual object (830) that represents the operation target.

According to this configuration, it is easy to understand the positional relation between an operation target and another object.

Configuration 18

The control apparatus according to any one of configurations 1 to 17, wherein the display control unit determines a display size of a virtual object that represents the operation target, based on a size of the operation target.

According to this configuration, it is easy to understand the positional relation between an operation target and the environment around the operation target.

Configuration 19

A non-transitory storage medium that stores a program for causing a computer to function as each unit of the control apparatus according to any one of configurations 1 to 18.

According to this configuration, each of the above configurations can be realized in a form of a storage medium that stores a program.

Configuration 20

A control method for remotely operating an operation target (1), the method comprising:

acquiring information regarding an object (402, 403) that exists in the surroundings of the operation target, and is not to be operated by a control apparatus that executes the control method, from an information providing unit (502, 511) outside of the control apparatus (step S702);

determining a virtual object (810, 820) for representing the object, based on the information regarding the object (step S707); and displaying the virtual object at a display position corresponding to a geographical location of the object (step S708).

According to this configuration, an image for a remote operation can be generated based on the information regarding the object, and thus it is not necessary to receive an image of the object itself, and the communication amount is reduced.

The invention is not limited to the foregoing embodiments, and various variations/changes are possible within the spirit of the invention.

What is claimed is:

1. A control apparatus comprising at least one processor circuit with a memory comprising instructions, that when executed by the at least one processor circuit, cause the at least one processor circuit to at least:

remotely operate an operation target;

acquire information regarding an object that exists in the surroundings of the operation target, and is not to be operated by the control apparatus, from an information providing device outside of the control apparatus;

determine a virtual object for representing the object, based on the information regarding the object;

determine a display position of the virtual object in consideration of a delay that occurs when the information is acquired from the information providing device; and display the virtual object at a display position corresponding to a geographical location of the object.

2. The control apparatus according to claim 1, wherein a type and geographical location of the object determined by the information providing device are acquired as the information regarding the object.

3. The control apparatus according to claim 2, wherein a model corresponding to the type of the object from among a plurality of models is displayed as the virtual object.

4. The control apparatus according to claim 1, wherein the operation target is a mobile object.

5. The control apparatus according to claim 1, wherein the instructions further cause the at least one processor circuit to display at least one of a past movement path of the operation target, a predicted future movement path of the operation target, a past movement path of the object, and/or a predicted future movement path of the object.

6. The control apparatus according to claim 5, wherein the information providing device generates a predicted future movement path of the object based on a geographical location, speed, and acceleration rate of the object, and provides the predicted movement path to the control apparatus.

7. The control apparatus according to claim 6, wherein, when it is not possible to provide information regarding the object so as to satisfy a predetermined degree of accuracy, the information providing device provides original data for generating the information, to the control apparatus.

8. The control apparatus according to claim 6, wherein the information providing device is included in the operation target.

9. The control apparatus according to claim 1, wherein the instructions further cause the at least one processor circuit to:
provide an operation instruction to the operation target, and
determine the display position of the virtual object, in further consideration of a delay that occurs when the operation instruction is provided from the providing device to the operation target.

10. A control apparatus comprising at least one processor circuit with a memory comprising instructions, that when executed by the at least one processor circuit, cause the at least one processor circuit to at least:
remotely operate an operation target;
acquire information regarding an object that exists in the surroundings of the operation target, and is not to be operated by the control apparatus, from an information providing device outside of the control apparatus;
determine a virtual object for representing the object, based on the information regarding the object;
select a display mode from a plurality of display modes that include a first display mode in which display related to the object is performed using the virtual object and a second display mode in which display related to the object is performed using an image obtained by the operation target; and
display the virtual object at a display position corresponding to a geographical location of the object.

11. The control apparatus according to claim 10, wherein the instructions further cause the at least one processor circuit to, when the display mode is to be changed, notify a user of the control apparatus that the display mode is to be changed.

12. The control apparatus according to claim 10, wherein the instructions further cause the at least one processor circuit to decrease a movement speed of the operation target, before the display mode is changed.

13. The control apparatus according to claim 10, wherein the instructions further cause the at least one processor circuit to change the display mode on a condition that a movement speed of the operation target is lower than or equal to a threshold speed.

14. The control apparatus according to claim 10, wherein the instructions further cause the at least one processor circuit to select a display mode based on a communication state between the information providing device and the control apparatus.

15. The control apparatus according to claim 14, wherein the instructions further cause the at least one processor circuit to, if a delay that is larger than or equal to a threshold is predicted based on the communication state, select the first display mode.

16. The control apparatus according to claim 1, wherein the instructions further cause the at least one processor circuit to display a virtual object that represents the operation target.

17. The control apparatus according to claim 1, wherein the instructions further cause the at least one processor circuit to determine a display size of a virtual object that represents the operation target, based on a size of the operation target.

18. A non-transitory storage medium that stores a program for causing a computer to function as each unit of the control apparatus according claim 1.

19. A control method for remotely operating an operation target, the method comprising:
remotely operating an operation target;
acquiring information regarding an object that exists in the surroundings of the operation target, and is not to be operated by a control apparatus that executes the control method, from an information providing device outside of the control apparatus;
determining a virtual object for representing the object, based on the information regarding the object;
determining a display position of the virtual object in consideration of a delay that occurs when the information is acquired from the information providing device; and
displaying the virtual object at a display position corresponding to a geographical location of the object.

20. A control method for remotely operating an operation target, the method comprising:
remotely operating an operation target;
acquiring information regarding an object that exists in the surroundings of the operation target, and is not to be operated by a control apparatus that executes the control method, from an information providing device outside of the control apparatus;
determining a virtual object for representing the object, based on the information regarding the object;

selecting a display mode from a plurality of display modes that include a first display mode in which display related to the object is performed using the virtual object and a second display mode in which display related to the object is performed using an image obtained by the operation target; and displaying the virtual object at a display position corresponding to a geographical location of the object.

* * * * *